Figure 1:
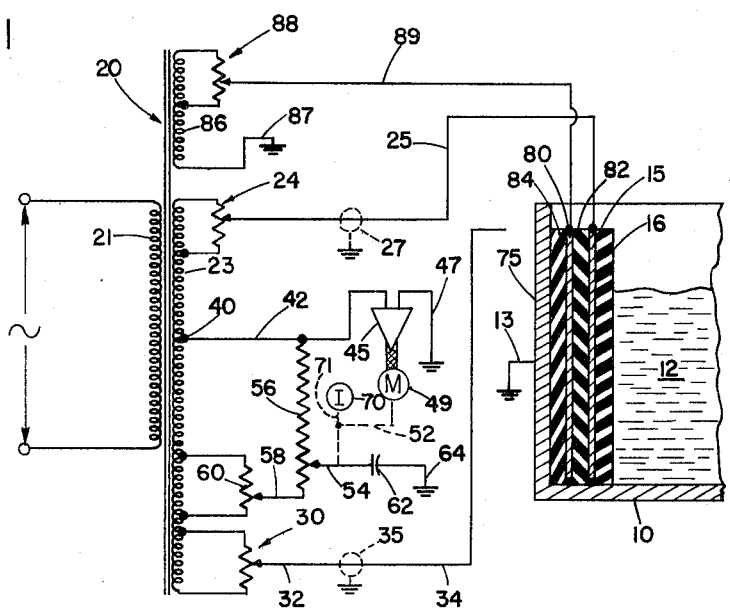

Jan. 25, 1966        H. M. HERMANSON        3,230,770

CONTROL APPARATUS

Filed June 29, 1961

INVENTOR.
HARRY M. HERMANSON
BY Charles J. Engemach

ATTORNEY

United States Patent Office 3,230,770
Patented Jan. 25, 1966

3,230,770
CONTROL APPARATUS
Harry M. Hermanson, Golden Valley, Minn., assignor to Honeywell Inc., a corporation of Delaware
Filed June 29, 1961, Ser. No. 120,662
6 Claims. (Cl. 73—304)

This invention relates to control apparatus and more particularly to fluid level sensing devices for use with fluid having various conductivities.

In recent years it is become desirable to measure the depth of conductive fluids in a container and in particular it is desirable to utilize highly accurate capacitance type bridges for such measurement. Since capacitance type bridges utilize a sensing capacitor located in the fluid to be sensed various problems are encountered with conductive fluids. For example the fluid is frequently housed in a metal container which is at ground potential so that without insulation the capacitor electrodes would be short circuited to ground as well as being short circuited to each other. It is usual when measuring conductive fluids to surround at least one of the electrodes with an insulater to prevent contact with the conductive fluid. In such a case a capacitance is formed across the insulator between the electrode and the fluid, which may be effectively at ground potential. Several capacitive fluid gaging circuits have used only one capacitive electrode emersed in the fluid and have utilized this capacitance between the electrode and the fluid across the insulation as the measuring capacitance. It is sometimes desirable in this type of circuit to mount the single electrode along a grounded conductive surface such as one of the container walls or the surface of a member floating in the fluid but in doing so a serious problem results due to the greater capacitance between the electrode and the surface to which it is mounted. This capacitance does not vary with fluid level and is usually much larger than the capacitance to the fluid which is being measured. Thus the variation of capacitance with fluid level is masked by the large capacitance between the electrode and the conductive surface. Also, due to conditions such as rust or corrosion on the surface, this capacitance may vary over a period of time and thus upset the accuracy of the measuring bridge. The present invention, when used in this type of circuit, will minimize this unwanted capacitance to ground so that the circuit remains accurate regardless of changes in capacitance between the electrode and the mounting surface.

When measuring conductive fluids it is often desirable to utilize two electrodes neither of which is at ground potential. If both electrodes are insulated from the conductive fluid, there is produced an undesirable capacitance between each electrode and ground and if the outer electrode is left bare there will be a short circuit to ground or a finite resistance depending upon the fluid's conductivity. This will often cause undesirable phase shifts and will load the source of voltage to such an extent that the circuit becomes inaccurate. The present invention used with such a circuit will prevent or minimize any leakage current from the electrodes of the sensing capacitor to the grounded container.

Figure 2:
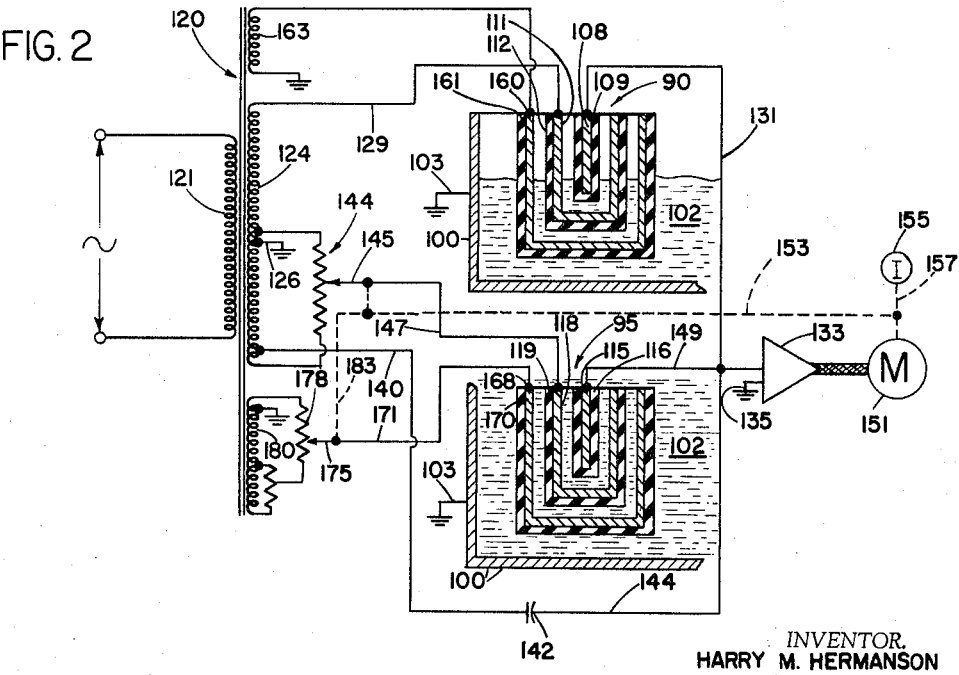

Briefly the elimination of unwanted leakage current is accomplished by means of an additional electrode surrounding and shielding the sensing electrode or the outer electrode, the additional electrode being independently energized to the same potential as the sensing electrode. This shielding electrode being at the same potential as the measuring or outer electrode will prevent any current flow from the measuring electrode to the container. A more complete understanding of the present invention will be obtained upon examination of the specification, claims and drawings in which:

FIGURE 1 is a schematic representation of a first embodiment of the present invention; and
FIGURE 2 is a schematic representation of a second embodiment of the present invention.

Referring now to FIGURE 1 which shows a portion of a fluid container 10 in which a conductive or partly conductive fluid 12 is situated. As is common, container 10 is metallic and is connected either intentionally or unintentionally to ground potential as shown by conductor 13. The circuit of FIGURE 1 employs a single sensing electrode 15 which is shielded from direct contact with the fluid 12 by insulation 16. A capacitance is formed between the electrode 15 and the fluid 12 with the insulation 16 forming the dielectric. It is seen that this capacitance varies with fluid level and may be used as an indication of the level of fluid in container 10.

The measuring circuit will now be described. Transformer 20 is shown in FIGURE 1 having a primary winding 21 connected to a source of alternating voltage and having a first secondary winding 23. The upper terminal of secondary 23 supplies energy to sensing electrode 15 by means of a calibration potentiometer 24 and a conductor 25 which is shielded with respect to ground as shown by reference numeral 27. Normally conductor 25 is relatively long and since it is surrounded by a grounded shield 27 some capacitance will exist between conductor 25 and ground. To eliminate this capacitance a novel compensating circuit is employed as follows: connected to the lower portion of secondary 23 is a calibration potentiometer 30 having a movable wiper 32 which is connected to a conductor 34 and shielded with respect to ground as shown by reference numeral 35. The voltage on the lower portion of secondary 23 is of opposite phase to that on the upper portion and thus the phase of the signal at wiper 32 and on conductor 34 is opposite to that on conductor 25. Conductor 34 is made to be equal in length to that of conductor 25 and in fact is preferrably placed adjacent conductor 25 all the way out to the sensing electrode 15. Conductor 34 is not itself connected to anything but, because of the shield 35, it will present a capacitance to ground of magnitude substantially equal to the capacitance formed from conductor 25 to ground. Thus any current flowing through the capacitance formed between conductor 25 and ground will have in the opposite leg of the bridge an equal current of opposite phase flowing from conductor 34 to ground. To assure that these two currents are of equal magnitude wiper 32 may be moved along a resistance winding of potentiometer 30. As will be shown these two currents cancel out and produce no net effect on the measuring bridge.

Secondary 23 has a tap 40 connected intermediate the end portions thereof. A conductor 42 is connected between tap 40 and one input terminal of an amplifier 45 the other input terminal of which is connected to ground by means of conductor 47. Amplifier 45 is connected to control a motor 49 which in turn operates through a mechanical linkage shown as dashed line 52 to position a wiper 54 on a rebalance potentiometer 56 which is connected between conductor 42 and a wiper 58 of a second calibration potentiometer 60 connected across the lower portion of secondary 23. Wiper 54 is connected to one electrode of a rebalance capacitor 62 the other electrode of which is connected to ground by conductor 64.

In the above described circuit it is seen that the sensing capacitance between electrode 15 and the fluid is in a first circuit to the input of amplifier 45 as follows: from ground through conductor 47, the input of amplifier 45, conductor 42, tap 40, the upper portion of secondary 23, calibration potentiometer 24, shielded conductor 25, electrode 15, the fluid 12, container 10 and conductor 13 back to ground. Any variation in fluid level will change the capacitance between electrode 15 and the fluid 12 and will thus present a change in signal at the input of amplifier 45. A second circuit to the amplifier 45 is formed as follows: from ground through conductor 47, the input of amplifier 45, conductor 42, tap 40, the upper portion of secondary 23, calibration potentiometer 24, conductor 25 and shielding 27 back to ground. This circuit presents a second input to the amplifier 45 of relatively fixed magnitude and of the same phase as the first described circuit. To eliminate the effects of the current in the second circuit a third circuit to the input of amplifier 45 is provided as follows: from ground through conductor 47, the input of amplifier 45, conductor 42, tap 40, the lower portion of secondary 23, calibration potentiometer 30, wiper 32, conductor 34 and shielding 35 back to ground. As mentioned above this circuit presents a signal of phase opposite to that on conductor 25 but of equal magnitude thereto and its effect is to null the signal from conductor 25 through shielding 27 to ground. Thus the only signal remaining in the sensing portion of the circuit is that due to the capacitance from electrode 15 to the fluid 12.

A fourth circuit to the input of amplifier 45 is completed as follows: from ground through conductor 47, the input of amplifier 45, conductor 42, rebalance potentiometer 56, wiper 54, capacitor 62, and conductor 64 back to ground. This last described circuit presents a signal of variable magnitude and a phase opposite to the signal in the first described sensing circuit. If these two signals are of equal magnitude there will be no input to the amplifier 45 and the circuit will be balanced. However, as the level of the fluid 12 changes in container 10, the capacitance from electrode 15 to the fluid 12 changes and an unbalance signal is presented to the input of amplifier 45. This signal at the input of amplifier 45 causes operation of the motor 49 which in turn controls the position of wiper 54. Depending upon the phase of the signal the amplifier 45, motor 49 will turn in a first direction or in the opposite direction but will always move wiper 54 in such a direction as to decrease the signal to the input of amplifier 45. When wiper 54 has moved to such a position that the signal through capacitor 62 is again equal to the signal through the capacitance formed by electrode 15 and the fluid 12 there will be no input to amplifier 45 and motor 49 will stop. At this time the position of motor 49 and the position of wiper 54 are indicative of the quantity of fluid in container 10. An indicator 70 may be connected to the output of motor 49 as by mechanical connection 71 to indicate this quantity.

There is one basic problem with the above described circuit and that is the capacitance which would exist between the capacitor plate 15 and the vertical wall 75 of container 10 upon which the sensing capacitor is mounted. This capacitance would normally be quite large and would tend to mask the sensing capacitance between electrode 15 and the fluid 12 as well as load the upper portion of secondary 23 and the input of amplifier 45. To overcome this problem an additional circuit is utilized and a shielding electrode 80 is employed. Electrode 80 is mounted between electrode 15 and the wall 75 of container 10 and is separated from electrode 15 by an insulator 82. Likewise electrode 80 is insulated from the wall 75 of container 10 by an insulator 84. A second secondary winding 86 of transformer 20 has its lower portion connected to ground by conductor 87 and its upper portion connected to a calibration potentiometer 88 and thence to electrode 80 by a conductor 89. The magnitude of the voltage on conductor 89 is adjusted to be substantially equal to the voltage on conductor 25 so that shielding electrode 80 is at substantially the same potential as electrode 15. Thus from electrode 15 to the wall 75 of container 10 a shield independently energized to the same potential as electrode 15 is interposed and obviously substantially no current can flow in this path. Of course there will be considerable capacitance from shielding electrode 80 to container wall 75 but this capacitance shunts secondary 86 and does not affect the sensing circuit.

Thus it is seen that the circuit of FIGURE 1 operates to provide a capacitance which varies accurately with fluid level and is operable in a conductive fluid despite the various other conductive paths which have hindered capacitive fluid level measuring bridges in the past.

While the above circuit has been described as used with a container housing a fluid, it should be understood that other applications are possible. For example, the sensing capacitor may be mounted on the wall of a boat or pontoon to determine to what depth the boat is situated in the water.

Referring now to FIGURE 2 there is shown a more standard type of fluid level sensing circuit employing a sensing capacitor 90 with two electrodes neither of which is connected to ground and a dielectric compensating capacitor 95 also having two electrodes neither of which is connected to ground. A shown in FIGURE 2 a portion of container 100 having a conductive fluid 102 therein is so mounted that the container wall is connected to ground as shown by a connection 103. A lower portion of the container 100 is also shown as 100' in which the compensating capacitor 95 is located. Compensating capacitor 95 is normally situated near the bottom of the container so as to be completely surrounded with the fluid to be measured.

Sensing capacitor 90 consists of an inner electrode 108 surrounded by insulation 109 and an outer electrode 111 having an insulator 112 on its outer surface. Fluid 102 is allowed to rise and fall between electrodes 108 and 111 and since the inner portion of electrode 111 is in contact with the fluid 102 a capacitance is formed between electrode 108 and electrode 111 by means of the conductive fluid 102 with the dielectric of this capacitor being formed by insulation 109. It is seen that as fluid rises and falls in sensing capacitor 90 the capacitance between electrode 108 and 111 will change accordingly.

In similar fashion compensating capacitor 95 has an inner electrode 115 which is surrounded by insulation 116 and an outer electrode 118 with insulation 119 on its outer surface. Since the inner surface of electrode 118 is in contact with the conductive fluid 102, a capacitance is formed between electrode 115 and electrode 118 with insulation 116 forming the dielectric. Since the fluid 102 may change conductivity and dielectric constant it would at times cause changes in the sensing capacitance. However, these fluid changes also affect the dielectric constant compensating capacitor 95 so that changes in the conductivity or dielectric constant of fluid 102 which effect the sensing capacitor 90 will cause compensating changes in capacitor 95 in a manner well known in the art.

A transformer 120 is shown in FIGURE 2 having a primary winding 121 connected to an alternating source of voltage and a first secondary winding 124 with upper and lower terminals and intermediate grounded tap 126. The upper terminal of transformer 124 is connected by conductor 129 to the outer electrode 111. The inner electrode 108 is connected by a conductor 131 to one input terminal of an amplifier 133 having its other input terminal of an amplifier 133 having its other input terminal connected to ground by a connection 135. It is seen that changes in the level of the fluid 102 which cause a change in the capacitance between outer electrode 111 and inner electrode 108 will change the signal to the input of amplifier 133 which signal has a phase dependent upon the phase of the signal across the upper portion of transformer secondary 124.

Connected near the bottom terminal of secondary 124 is a conductor 140 which is connected to an empty tank reference capacitor 142 the other side of which is connected by a conductor 144 to the input terminal of amplifier 133. The purpose of capacitor 142 is to null that portion of the signal from sensing capacitor 90 due to its basic or empty capacitance as is well known in the art.

Connected across the lower portion of secondary 124 is a rebalance potentiometer 144 having a movable wiper 145. Wiper 145 is connected by a conductor 147 to the outer electrode 118 of compensating capacitor 95. Inner electrode 115 of compensating capacitor 95 is connected by a conductor 149 to the input of amplifier 133. The signal on wiper 145 is of opposite phase to that on the upper portion of transformer secondary 124 and is of magnitude sufficient to present a signal to amplifier 133 equal to the signal from sensing capacitor 90. At this time the input to amplifier 133 is nulled. Amplifier 133 operates to control a motor 151 which by means of a mechanical connection shown as dashed line 153 operates to position wiper 145 on potentiometer 144. It is seen that any change in the fluid level in container 100 which changes the capacitance of the sensing capacitor 90 will cause operation of motor 151 in such a direction as to reposition wiper 145 on potentiometer 144 until the magnitude of the signal from the compensating capacitor 95 is again equal to that from the sensing capacitor 90 at which time the input to the amplifier is again nulled and motor 151 stops in a position indicative of the quantity of fluid in container 100. An indicator 155 is shown connected to motor 151 by a mechanical connection shown as dashed line 157 and is used to indicate the quantity of fluid in container 100.

The above described circuit is more or less conventional in form and if a more complete understanding of the circuit is desired reference may be had to a copending application, Richard M. Franzel et al., Serial No. 200,258, filed December 11, 1950, assigned to the same assignee as the present invention.

If the circuit above described were to be left to operate without any further additions a leakage path would be formed from electrode 111 through the conductive fluid 102 and container 100 to ground through a lead 103. This leakage would tend to cause undesired phase shifts in the circuit and would load down transformer secondary 124. Likewise with the compensating capacitor 95 a leakage current would exist between electrode 118 through the conductive fluid 102, the container 100′ and ground at 103. To remove this leakage path from the circuit the following additional components have been employed. As shown in FIGURE 2 a third electrode 160 having an insulation 161 surrounds sensing capacitor 90. Electrode 160 is connected to a transformer secondary 163 which is of such magnitude as to place a voltage on electrode 160 substantially equal to the voltage on electrode 111. Since electrode 160 surrounds electrode 111 in all portions thereof there will be substantially no tendency for current to flow from electrode 111 to the conductive fluid to the grounded container 100 since it would have to pass a point of potential equal to its own. Thus by provision of electrode 160 the leakage current from sensing capacitor 90 is avoided and the sensing leg will operate accurately to indicate fluid quantity.

Likewise the compensating capacitor 95 is provided with the third electrode 168 having insulation 170 on its outer surface. Electrode 168 is connected by a conductor 171 to the wiper 175 of a potentiometer 178. Potentiometer 178 is connected across a secondary 180 so that a voltage is applied by wiper 175 to electrode 168 of magnitude equal to that on electrode 118. Since the voltage applied to electrode 118 is variable, wiper 175 is made to vary in the same manner as wiper 145 by means of a mechanical connection shown as dashed line 183. Thus the voltage on wipers 175 and 145 will be substantially equal at all times and the voltage on electrode 168 will be substantially equal to that on electrode 118. Thus for the same reasons as explained in regard to the sensing electrode 90 the leakage path for current for electrode 118 through the conductive electrode 102 is eliminated. The rebalance leg of the bridge will therefore remain accurate regardless of the conductivity of the fluid 102.

It is thus seen that the apparatus has been provided for measuring the quantity of conductive fluids and avoiding the problem of leakage paths through the fluid which load the voltage sources and otherwise disrupt the satisfactory operation of the circuit. Many variations and additions will occur to those skilled in the art and I do not intend to be limited by the specific disclosures described in connection with the preferred embodiments. I intend only to be limited by the following claims.

I claim:

1. A fluid level sensing device for use with a fluid of variable conductivity comprising, in combination: a first source of voltage of a first magnitude and sense; a fluid level sensing capacitor having a first uninsulated electrode connected to the first source of voltage and having an insulated second electrode; voltage responsive means having an input connected to the second electrode and having an output; a second source of voltage of variable magnitude and of sense opposite to said first source of voltage; a second capacitor connected between said second source of voltage and the input to said voltage responsive means; motive means connected to the output of said voltage responsive means and operable to vary the magnitude of said second source of voltage to balance the circuit as an indication of fluid level; screen means surrounding said fluid level sensing capacitor; and a third source of voltage of the same magnitude and sense as said first source of voltage connected to said screen means to minimize the leakage current from the first electrode through the conductive fluid.

2. A fluid level gage for use with a conductive fluid in a container comprising, in combination: a first source of voltage of a first magnitude and sense; a sensing capacitor having first and second electrodes for immersion in the fluid conductive fluid; voltage responsive means having an input; means connecting the first electrode of said sensing capacitor to said first source of voltage; means connecting the second electrode of said sensing capacitor to the input of said voltage responsive means, the rise and fall of the fluid in the container causing a change in signal from said first voltage source, through said sensing capacitor to the input of said voltage responsive means as an indication of fluid level, said fluid also providing a leakage path from said sensing capacitor to the container; a second source of voltage of substantially the same magnitude and sense as said first source of voltage; and shielding means surrounding said sensing capacitor and connected to said second source of voltage.

3. Apparatus of the class described comprising in combination: a first source of alternating voltage of a first phase: a condition responsive device located remote from said first source of voltage; a first shielded conductor connecting said first source of voltage to said condition responsive device, a first capacitance being formed between the conductor and the shield of said first shielded conductor; a second source of alternating voltage of phase opposite the first phase; and a second shielded conductor having one end connected to the second source of voltage and having a second end located at a remote point from said first source of voltage but remaining unconnected, a second capacitance being formed between the conductor and the shield of said second shielded conductor, the product of the second voltage source and the second capacitance being chosen to substantially equal to the product of the first voltage source and the first capacitance.

4. A fluid level sensing capacitor for use in a conductive fluid comprising, in combination: first and second substantially equal sources of potential; a first electrode insulated to prevent direct contact with the fluid; a second uninsulated electrode connected to the first source of potential; and a screen electrode surrounding said first and second electrodes connected to the second source of potential so that the tendency for leakage current to flow from the second electrode through the conductive fluid is minimized.

5. Apparatus for minimizing the leakage current from a fluid level sensing capacitor, at least partially immersed in a conductive fluid, and which is energized to a first potential with respect to ground, to a fluid container comprising, in combination: a conductive screen mounted so as to substantially surround all portions of the sensing capacitor which may contact the conductive fluid and means energizing said screen independently of the capacitor to substantially the first potential.

6. Apparatus for use with a capacitor having a first electrode energized to a first potential with respect to ground comprising, in combination: means for mounting the capacitor in a conductive fluid environment which provides a leakage path from the first electrode to ground; a conductive shield, mounted to substantially surround all portions of the first electrode which may contact the conductive fluid, and means independently energizing said shield to substantially the first potential for minimizing any current flow in said leakage path.

References Cited by the Examiner
UNITED STATES PATENTS

| | | | |
|---|---|---|---|
| 2,200,678 | 5/1940 | Pratt | 174—35.4 |
| 2,699,523 | 1/1955 | Meyers | 73—304 |
| 2,849,882 | 9/1958 | Lee | 73—304 |
| 2,950,426 | 8/1960 | Frome | 73—304 X |
| 3,013,102 | 12/1961 | Doll | 174—35.4 |
| 3,022,665 | 2/1962 | Smith | 73—304 |
| 3,037,385 | 6/1962 | Franzel et al. | 73—304 |
| 3,119,266 | 1/1964 | Atkinson | 73—304 |

OTHER REFERENCES

Schafer: Airplane Fuel Gauge, in Electronics, vol. 2, issue 4, April 1950—pp. 77–79.

Stout: Basic Electrical Measurements (Prentice Hall, New York), 1960, pp. 193–195.

ISAAC LISANN, *Primary Examiner.*